US008638386B2

(12) United States Patent
Mukai

(10) Patent No.: US 8,638,386 B2
(45) Date of Patent: Jan. 28, 2014

(54) IMAGE PICKUP DEVICE

(75) Inventor: Takanori Mukai, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/394,661

(22) PCT Filed: Aug. 31, 2010

(86) PCT No.: PCT/JP2010/064761
§ 371 (c)(1),
(2), (4) Date: Mar. 7, 2012

(87) PCT Pub. No.: WO2011/033929
PCT Pub. Date: Mar. 24, 2011

(65) Prior Publication Data
US 2012/0169920 A1    Jul. 5, 2012

(30) Foreign Application Priority Data
Sep. 15, 2009    (JP) .................................. 2009-213379

(51) Int. Cl.
*H04N 5/225* (2006.01)
(52) U.S. Cl.
USPC ............ 348/335; 348/340; 348/360; 348/375
(58) Field of Classification Search
USPC ................. 348/335, 373–375, 340, 342, 345, 348/218.1, 208.3, 219.1, 351
See application file for complete search history.

(56) References Cited

U.S. PATENT DOCUMENTS

| 5,032,919 | A | * | 7/1991 | Randmae | 348/345 |
| 5,825,559 | A | * | 10/1998 | Johnson et al. | 359/819 |
| 2007/0077052 | A1 | | 4/2007 | Chang | |
| 2008/0080072 | A1 | * | 4/2008 | Chang | 359/823 |
| 2008/0174690 | A1 | * | 7/2008 | Chang | 348/345 |
| 2009/0174785 | A1 | | 7/2009 | Uchida | |
| 2009/0303379 | A1 | * | 12/2009 | Wada et al. | 348/373 |

FOREIGN PATENT DOCUMENTS

| EP | 1 337 106 A1 | 8/2003 |
| EP | 1 972 979 A1 | 9/2008 |
| JP | 2-43072 A | 2/1990 |
| JP | 5-203864 | 8/1993 |
| JP | 05 203864 | 8/1993 |

(Continued)

OTHER PUBLICATIONS

Japanese Office Action issued Nov. 27, 2012, in Patent Application No. 2009-213379.

(Continued)

*Primary Examiner* — Tuan Ho
*Assistant Examiner* — ZhenZhen Wu
(74) *Attorney, Agent, or Firm* — Oblon, Spivak, McClelland, Maier & Neustadt, L.L.P.

(57) ABSTRACT

An image pickup device includes a placing section on which an image pickup element that receives light from an object is placed, a tilted surface section, which is provided on the placing section and is tilted with respect to the axis of light that enters the image pickup element, a direction specifying section, which specifies a moving direction so that the placing section moves parallel to the optical axis direction, a panel section having a surface perpendicular to the optical axis, and a rotating member, which is disposed between the tilted surface section and the panel section, and rotates and moves in the tilt direction of the tilted surface by being in contact with the tilted surface section.

8 Claims, 10 Drawing Sheets

(56) References Cited

FOREIGN PATENT DOCUMENTS

| JP | 08 079594 | 3/1996 |
| JP | 2580206 | 6/1998 |
| WO | 2007 080889 | 7/2007 |

OTHER PUBLICATIONS

Extended European Search Report issued May 15, 2013, in Patent Application No. 10817042.4.

* cited by examiner

IMAGE PICKUP DEVICE

TECHNICAL FIELD

The present invention relates to an image pickup device.

BACKGROUND ART

According to demands of the marketplace, a need for a high resolution of the quality of an image of an image pickup device such as a video camera or a monitoring camera has increased. For the high resolution of the image quality, an image pickup element becomes highly dense. Because a focal depth of the image pickup device is narrow when the resolution is high, it is necessary to accurately adjust a focal distance to properly adjust the focus of an image.

For this, it is necessary to first accurately adjust a flange focal length, which is a distance from a mounting surface of a lens to a light-receiving surface of the image pickup element. Patent Literature 1 discloses technology related to a position adjustment device of a solid-state image pickup element that adjusts the flange focal length. In addition, Patent Literature 2 discloses technology related to a holding device of an image pickup element that makes the center of an optical axis of the image pickup element consistent with an optical axis of a lens.

CITATION LIST

Patent Literature

Patent Literature 1: JP 8-79594A
Patent Literature 1: Japanese Utility Model Registration No.

SUMMARY OF INVENTION

Technical Problem

Incidentally, it is further necessary to place the light-receiving surface of the image pickup element inside the entire focal depth by accurately adjusting the alignment of the flange focal length so as to generate a state in which the entire image as well as the center of an image is in focus. For this, it is necessary to adjust the image pickup element to be perpendicular to the optical axis. Thereby, because it is possible to place the light-receiving surface of the image pickup element within the entire focal depth, the entire image can be in focus.

However, in the related art, it is difficult to suppress a tilt of the image pickup element even when the alignment is made with high accuracy. For example, in Patent Literature 1, a solid-state image pickup element disposed in a movable guide body moves with the rotation of a screw. However, because a minimum feed amount of the image pickup element is determined by a rotation angle of the screw in a range in which turning by hand is possible in this adjustment method, a feed amount in the order of several μm is not implemented. Further, in Patent Literature 1, there is no mechanism that regulates a tilt with respect to an optical axis of the image pickup element. In addition, because the number of components that affects the tilt of the image pickup element is large, it is difficult to suppress the tilt of the image pickup element.

In addition, in Patent Literature 2, a tilted surface formed in the holding member where the image pickup element is disposed is constantly pressed to a tilted surface formed in a rod member rotatable around the optical axis. Thereby, the image pickup element moves in an optical axis direction. However, because a minimum feed amount of the image pickup element is determined by a rotation angle of a screw in a range in which turning by hand is possible in this method, a feed amount in the order of several μm is not implemented. Further, because the holding member and the rod member are formed using a mold and dimensions of the tilted surface are varied, it is difficult to suppress the tilt of the image pickup element.

A method of adjusting the movement of the image pickup element using the motor without manual adjustment of the user as described above is also possible. However, there is no method of precisely driving the image pickup element using the motor within the constraints of a limited size and mass-production cost of the image pickup device.

The present invention has been made in view of the above-described problem, and an object of the present invention is to provide a novel and improved image pickup device capable of easily implementing a mechanism in which alignment with high accuracy is possible.

Solution to Problem

According to an aspect of the present invention in order to achieve the above-mentioned object, there is provided an image pickup device including: a placing section on which an image pickup element that receives light from an object is placed; a tilted surface section provided on the placing section and tilted with respect to the axis of light that enters the image pickup element; a direction specifying section, which specifies a moving direction so that the placing section moves in parallel to an optical axis direction; a panel section having a surface perpendicular to the optical axis direction; and a rotating member, which is disposed between the tilted surface section and the panel section and rotates and moves along a tilt direction of the tilted surface section by being in contact with the tilted surface section.

The tilt direction of the tilted surface section may be a direction along a circumference centered on the optical axis, and the rotating member may rotate on the circumference centered on the optical axis.

The placing section may have a surface perpendicular to the optical axis, and the direction specifying section may be fixed to the panel section.

The direction specifying section may be three rod members parallel to the optical axis, and a through-hole through which the direction specifying section passes in parallel to the optical axis may be provided in the placing section.

The image pickup device may have a pressing member, which presses the placing section to a panel side.

The image pickup device may further include an annular holding member, which rotates around the optical axis and rotatably holds the rotating member; and a drive section, which causes the holding member to rotate.

Three tilted surface sections may be provided on a circumference centered on the optical axis, and the rotating member may be provided on each of the tilted surface sections. The tilted surface sections may be disposed at intervals that are not equal to each other.

The image pickup device may further include: a friction reduction member, which is disposed between the rotating member and the panel section and reduces friction with the rotating member compared to friction between the panel section and the rotating member.

The image pickup device may include an infrared (IR) cut filter, which is provided on the optical axis from the image pickup element to the object and fixed to the panel.

Advantageous Effects of Invention

According to the present invention as described above, it is possible to easily implement a mechanism in which alignment with high accuracy is possible.

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and repeated explanation is omitted.

Description will be given in the following order.
1. Configuration of Image Pickup Device 100
2. Operation of Image Pickup Device 100
<1. Configuration of Image Pickup Device 100>

Figure 1:
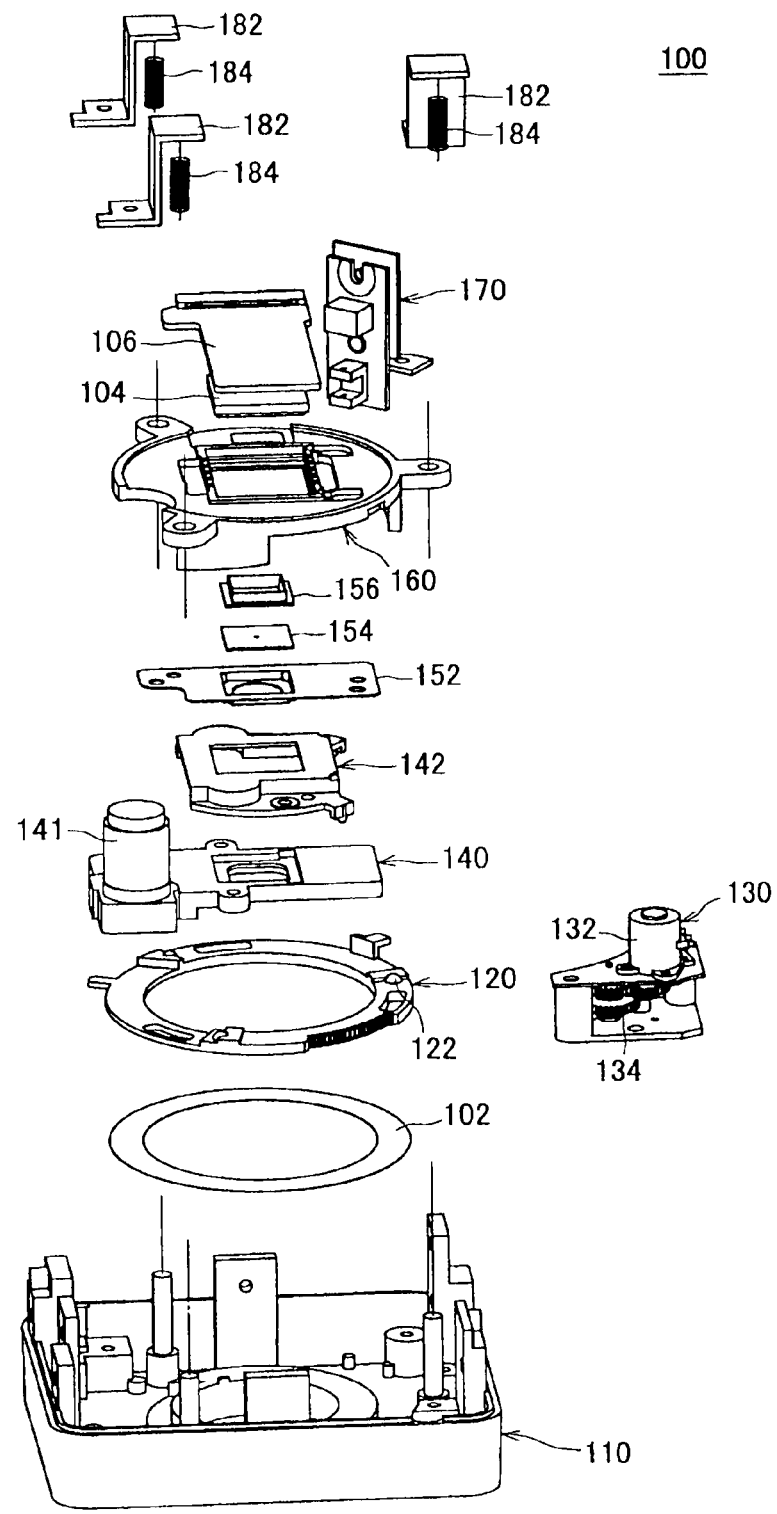
FIG. 1 is an exploded perspective view illustrating an image pickup device according to an embodiment of the present invention.

First, the configuration of the image pickup device 100 according to an embodiment of the present invention will be described with reference to FIG. 1. FIG. 1 is an exploded perspective view illustrating the image pickup device 100 according to this embodiment.

The image pickup device 100 of this embodiment is, for example, a monitoring camera fixed to a ceiling or the like, and has a main body section in which mounting and removal of a lens are possible. An example of the lens (not illustrated) mounted in the image pickup device 100 is a C mount lens. In the image pickup device 100 of this embodiment, position adjustment of a CMOS image sensor provided inside the main body section is possible. Because it is possible to first accurately adjust a flange focal length, which is a distance from the mounting surface of the lens to a light-receiving surface of the image pickup element, it is possible to focus on the entire image even when a high-resolution CMOS image sensor is used.

As illustrated in FIG. 1, for example, the image pickup device 100 includes a front panel 110, a thin plate 102, a ball holder 120, a drive section 130, an IR cut unit 140, an IR cut unit pressing section 142, an optical low-pass filter pressing section 152, an optical low-pass filter 154, a seal member 156, a CMOS adaptor 160, a CMOS image sensor 104, a board 106, an end point sensor 170, spring pressing sections 182, and springs 184.

In the image pickup device 100, the lens, an IR cut filter (not illustrated) provided in the IR cut unit 140, the optical low-pass filter 154, and the CMOS image sensor 104 are disposed on the same optical axis.

FIG. 1 is a diagram in which a lens mounting side of the image pickup device 100 is on the bottom. Inside the front panel 110, the image pickup device 100 is assembled in which the front panel 110, the thin plate 102, the ball holder 120, the IR cut unit 140, the CMOS adaptor 160, the CMOS image sensor 104, and the hoard 106 are superimposed in order from a hack surface 111 of the front panel 110.

Next, the component members will be described in detail.

[Front Panel 110]

Figure 2:
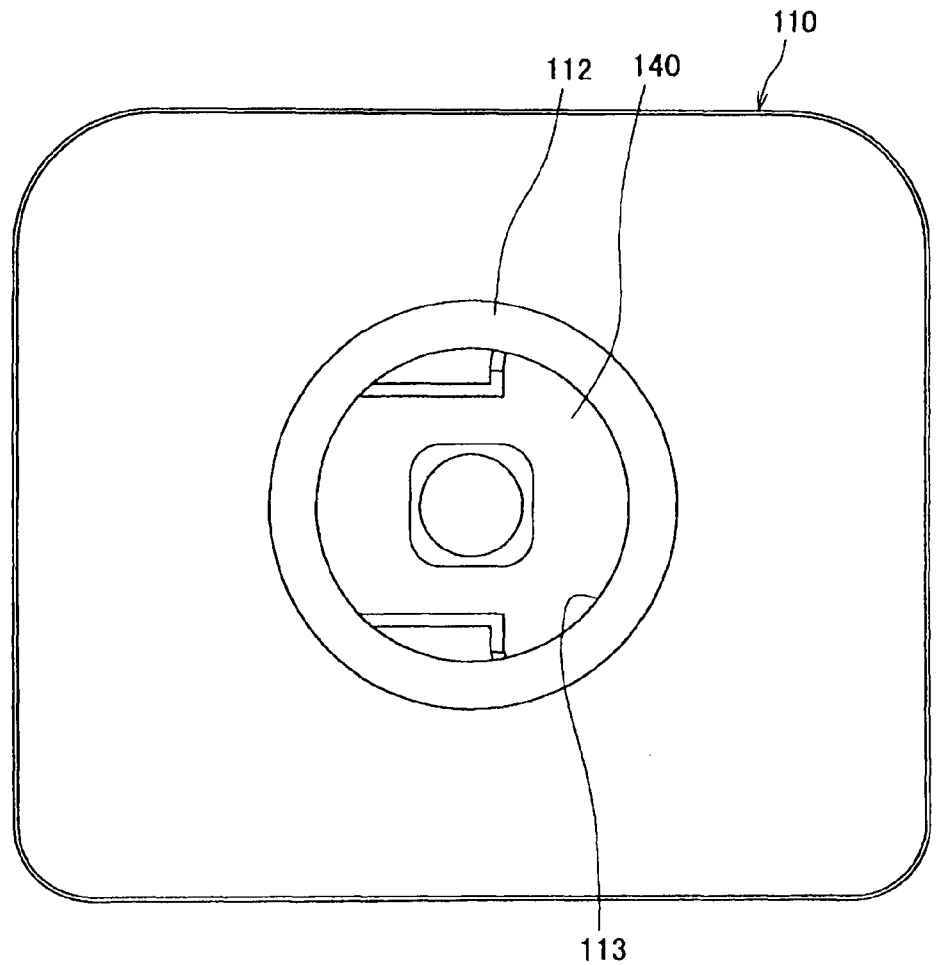
FIG. 2 is a front view illustrating an image pickup device 100 according to the same embodiment.
Figure 3:
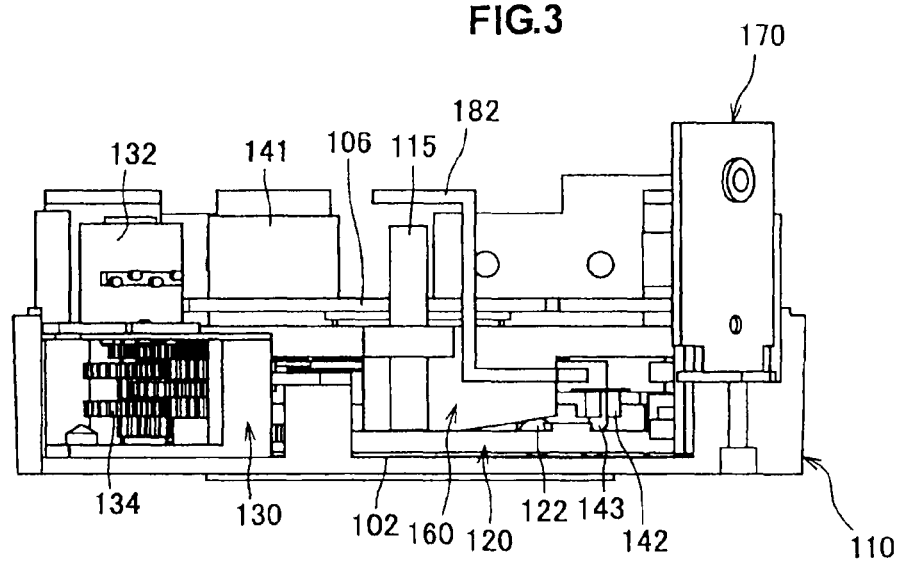
FIG. 3 is a sectional view illustrating the image pickup device 100 according to the same embodiment.

The front panel 110 is a housing of the image pickup device 100, and the lens is disposed on a front side of the front panel 110 illustrated in FIG. 2. FIG. 2 is a front view illustrating the image pickup device 100 according to this embodiment. FIG. 2 illustrates a state in which the lens is removed, and the lens mounting section 112 is provided at the center of the front panel. In FIG. 2, the IR cut unit 140 of the inside is viewed through the opening section 113. A female screw is provided inside the opening section 113, and can be coupled to a male screw section of the lens. As a method of mounting the lens, types other than a screw type may be used.

Figure 4:
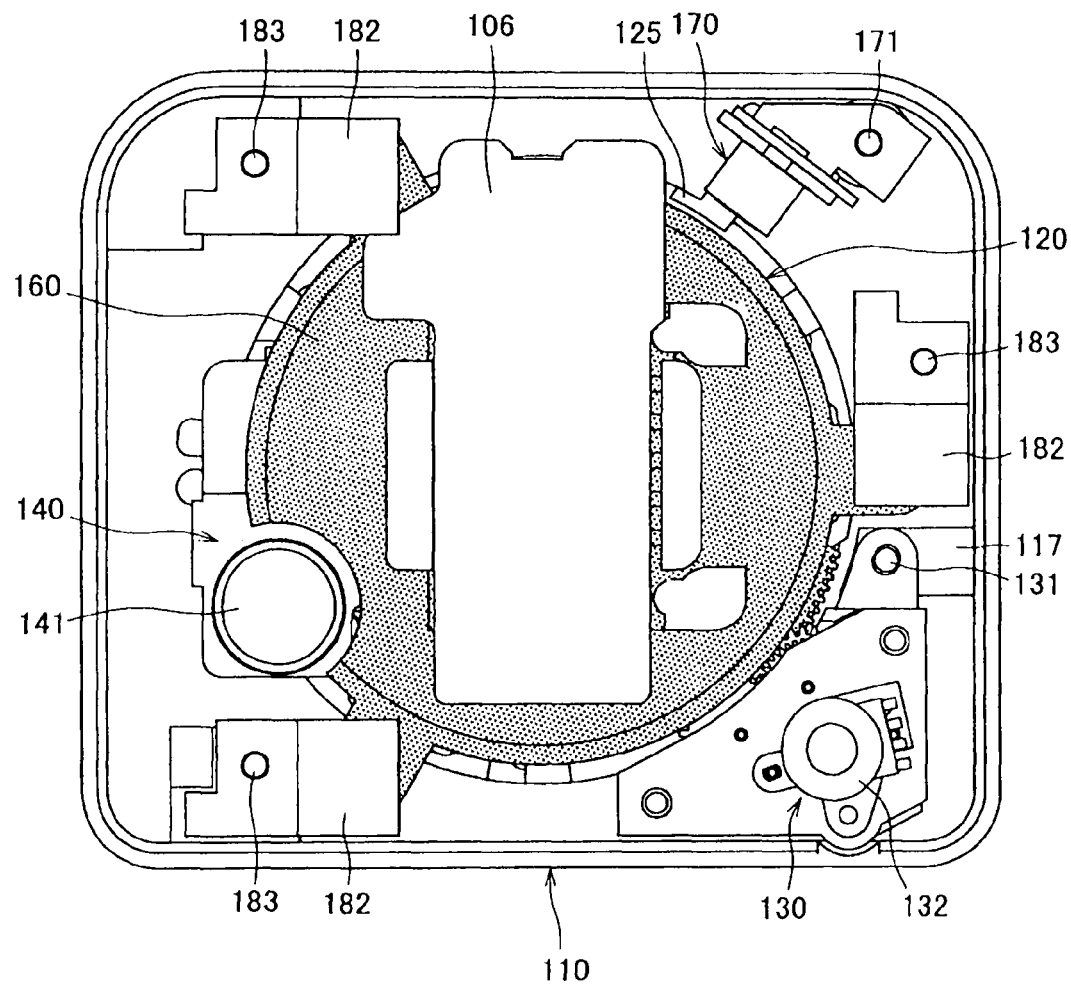
FIG. 4 is a rear view illustrating the image pickup device 100 according to the same embodiment.
Figure 5:
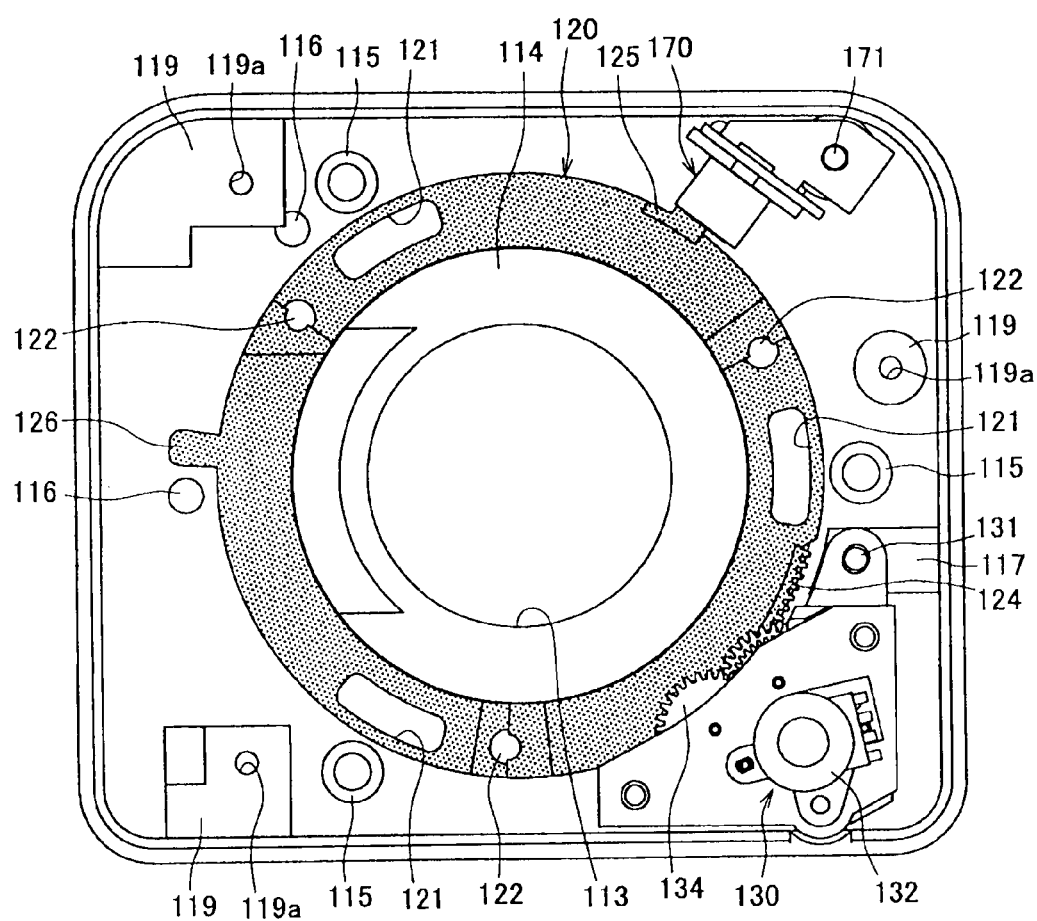
FIG. 5 is a rear view illustrating the image pickup device 100 according to the same embodiment.
Figure 6:
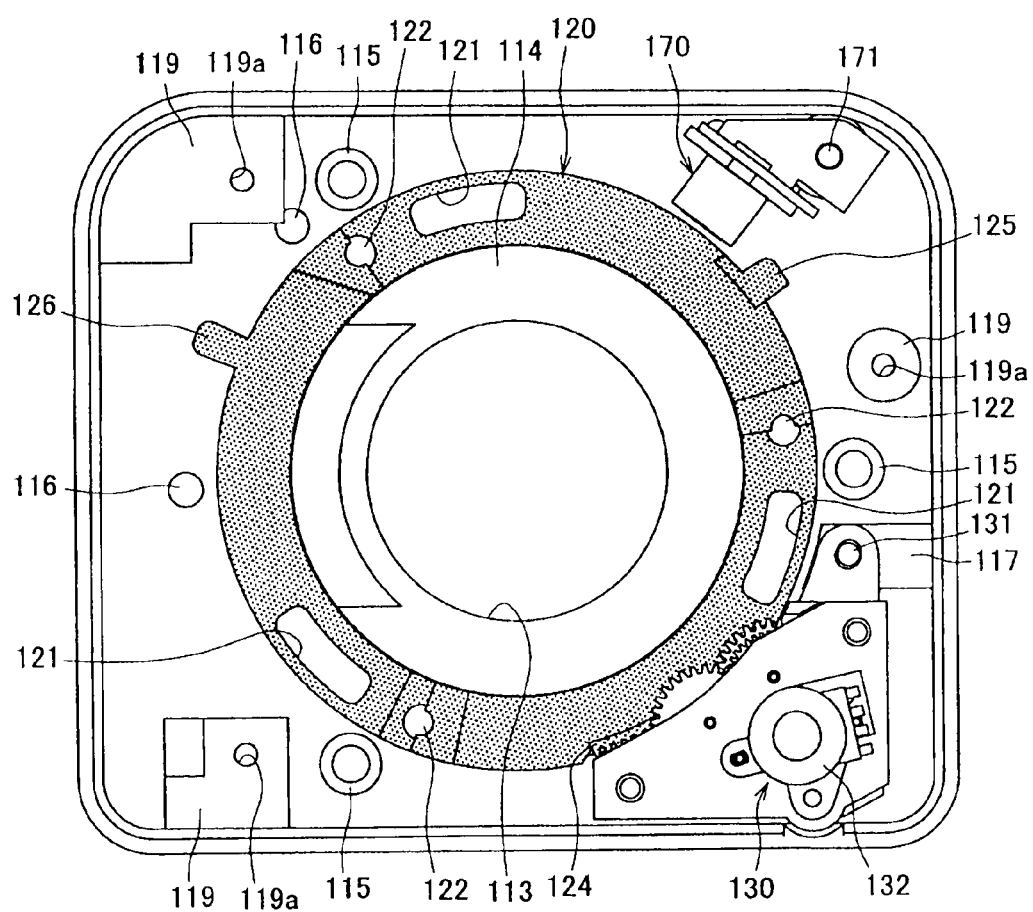
FIG. 6 is a rear view illustrating the image pickup device 100 according to the same embodiment.
Figure 7:
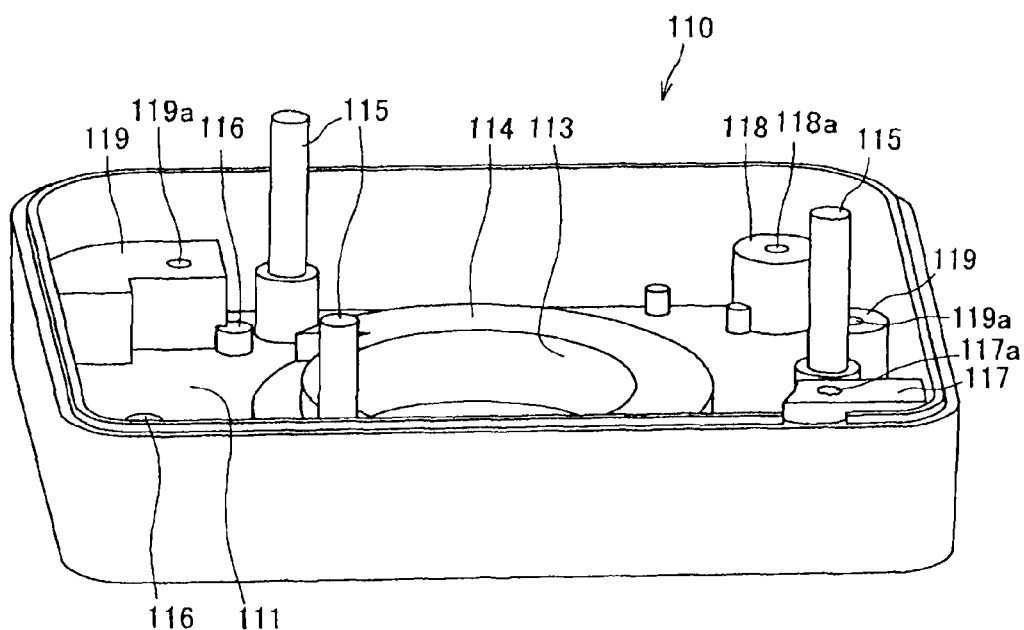
FIG. 7 is a perspective view illustrating a front panel 110 of the image pickup device 100 according to the same embodiment.
Figure 8:
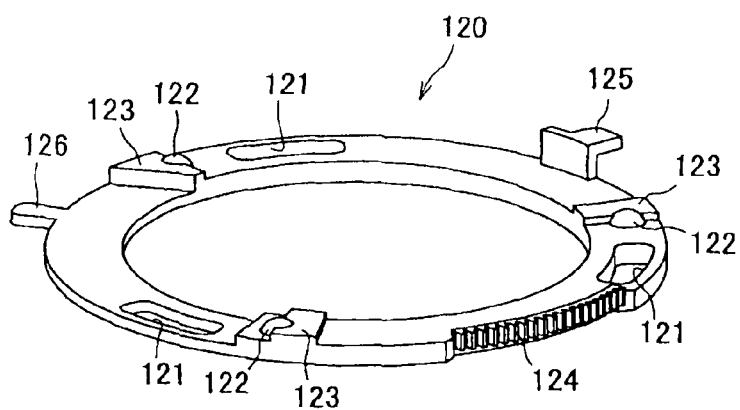
FIG. 8 is a perspective view illustrating a ball holder 120 of the image pickup device 100 according to the same embodiment.
Figure 9:
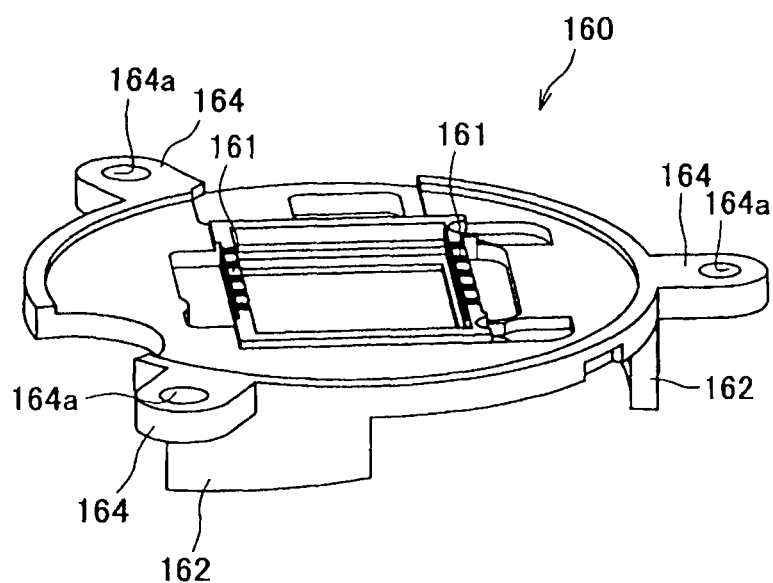
FIG. 9 is a perspective view illustrating a complementary metal-oxide semiconductor (CMOS) adaptor 160 of the image pickup device 100 according to the same embodiment.
Figure 10:
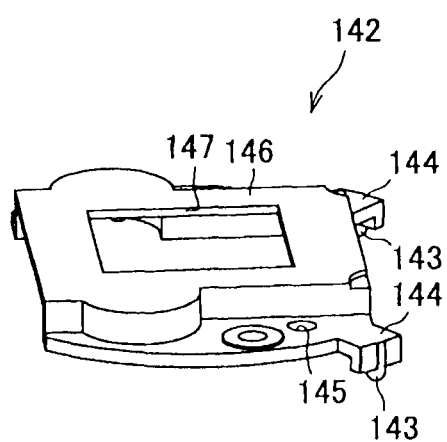
FIG. 10 is a perspective view illustrating an IR cut unit pressing section 142 of the image pickup device 100 according to the same embodiment.
Figure 11:
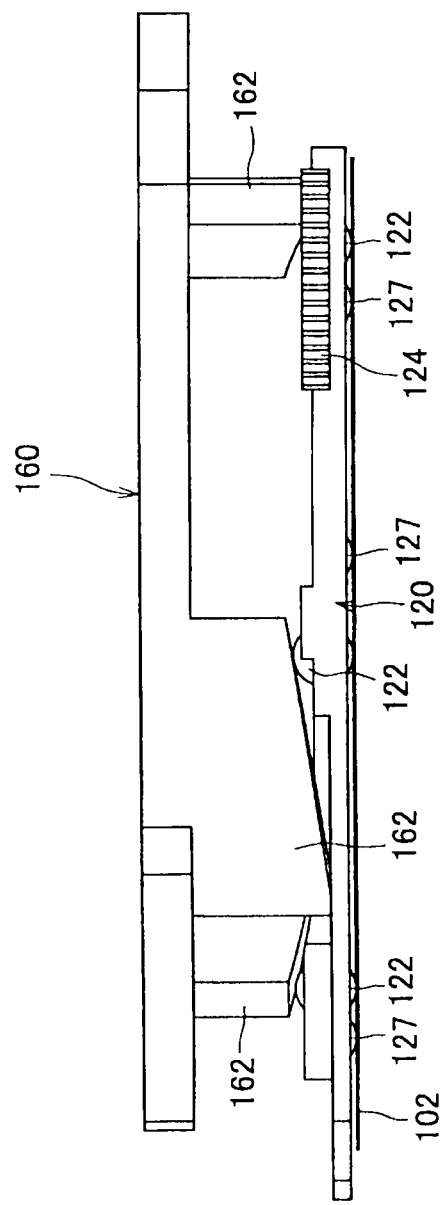
FIG. 11 is a side view illustrating the CMOS adaptor 160 and the ball holder 120 of the image pickup device 100 according to the same embodiment.
Figure 12:
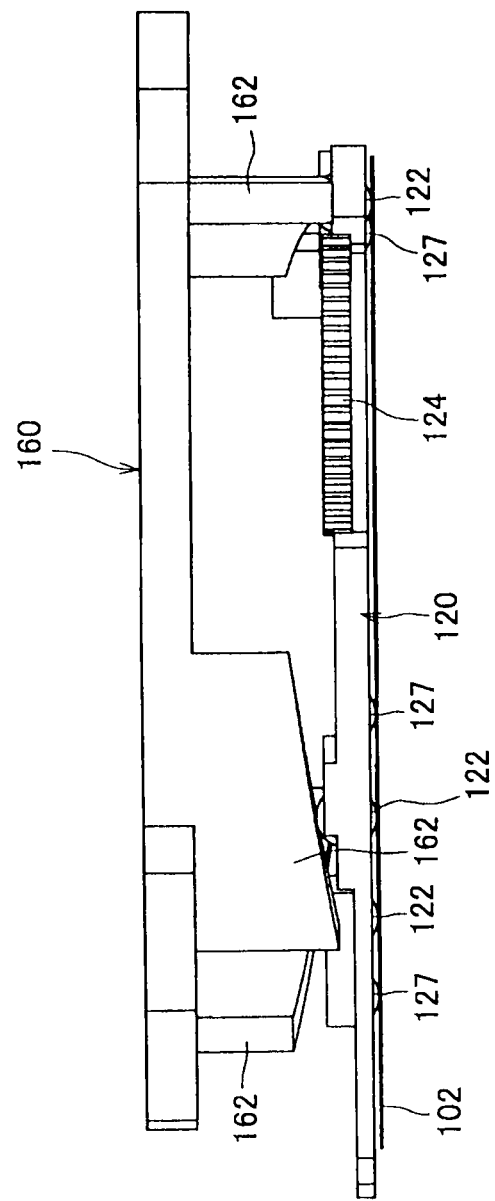
FIG. 12 is a side view illustrating the CMOS adaptor 160 and the ball holder 120 of the image pickup device 100 according to the same embodiment.

The front panel 110 internally accommodates the components of the image pickup device 100. FIGS. 4 to 6 are rear views illustrating the image pickup device 100 according to this embodiment. In addition, FIG. 7 is a perspective view illustrating the front panel 110 of the image pickup device 100 according to this embodiment. FIG. 4 illustrates a state in which a back cover (not illustrated) of the image pickup device 100 is removed. FIGS. 5 and 6 illustrate a state in which the spring pressing sections 182, the springs 184, the board 106, the CMOS image sensor 104, and the CMOS adaptor 160 are removed from the image pickup device 100 illustrated in FIG. 4.

As illustrated in FIG. 2 or 7, in the front panel 110, for example, a lens mounting section 112 is provided on the front side, and an annular projection section 114, shall members 115, a stopper 116, fixing sections 117, 118, and 119, and fixing holes 117a, 118a, and 119a are integrally formed on the side of the back surface 111.

The back surface 111 of the front panel 110 is a surface formed to be accurately perpendicular to an optical axis. The front panel 110 is an example of a panel section.

The annular projection section 114 is a cylindrically-shaped member provided at the center of the back surface of the front panel 110, and becomes a base when the ball holder 120 rotates. Around the annular projection section 114, the annular thin plate 102 and the annular hall holder 120 are fitted. On the side of the CMOS image sensor 104 of the annular projection section 114, the IR cut unit 140 is fixed by the IR cut unit pressing section 142.

The shall member 115 is an example of a direction specifying section, and is a rod member, which specifies a moving direction so that a CMOS placing section 161 of the CMOS adaptor 160 moves parallel to the optical axis. The shall member 115 is formed to be perpendicular to the back surface 111 so that the shaft member 115 is parallel to the optical axis. A plurality of shaft members 115 are parallel to each other. The shaft members 115 guide the CMOS adaptor 160 so that the CMOS adaptor 160 moves in a parallel direction with respect to the optical axis by receiving a force generated when the CMOS adaptor 160 is pressed to the ball 122. Although the case where three shaft members 115 are disposed in this embodiment will be described, the present invention is not limited to this example.

The stopper 116 is a projection member provided to abut a second projection section 126 of the ball holder 120 so that the ball holder 120 does not excessively rotate.

On the hack surface 111 of the front panel 110, the drive section 130, the end point sensor 170, and the spring pressing section 182 are further disposed.

The fixing section 117 is a projection member configured to fix the drive section 130 to the front panel 110, and the drive section 130 is fixed to the front panel 130 by the screw hole 117a and a screw 131.

The fixing section 118 is a projection member configured to fix the end point sensor 170 to the front panel 110, and the end point sensor 170 is fixed to the front panel 130 by the screw hole 118a and a screw 171.

The fixing section 119 is a projection member configured to fix the spring pressing section 182 to the front panel 110, and the spring pressing section 182 is fixed to the front panel 130 by the screw hole 119a and a screw 183.

[Thin Plate 102]

The thin plate 102 is, for example, an annular thin-plate spring material of smooth stainless (steel use stainless (SUS)). The thin plate 102 is disposed between the front panel 110 and the ball 122. Thereby, the friction and wear are reduced when the ball 122 pressed from the side of the CMOS image sensor 104 slides, and the drive load of the drive section 130 is reduced when the hall 122 is rotationally driven. The thin plate 102 is an example of a friction reduction member. The front panel 110 is a die-cast such as an aluminum alloy or magnesium alloy, and the friction with the friction ball 122 on which the thin plate 102 is provided can be reduced when surface hardness and roughness are considered. The thin plate 102 is made of a thin-plate spring material of SUS, so that a plate thickness with high accuracy is easily available at a low price. Accuracy is good because the plate thickness of SUS is not affected by processing accuracy of a press or the like.

[Ball Holder 120]

The ball holder 120 is an annular holding member that rotates around the optical axis and rotatably holds the ball 122. The ball holder 120 is rotated by the motor 134 of the drive section 130 driven according to engagement between the gear section 124 of the ball holder 120 and the gear section 134 of the drive section 130.

The ball holder 120 has an opening section 121, a ball pressing section 123, the gear section 124, a first projection section 125, a second projection section 126, and a convex section 127. The first projection section 125 is a shutter configured to enable the end point sensor 170 to sense a rotation position of the ball holder 120. As illustrated in FIG. 5, a state in which the first projection section 125 is housed in the end point sensor 170 is the origin of the ball holder 120. The second projection section 126 is a projection section provided to abut the stopper 116, for example, so as to prevent runaway during an abnormal time.

When the CMOS adaptor 160 moves to a lens side in an optical axis direction, the tilted surface section 162 of the CMOS adaptor 160 conies close to the lens side. Thus, the opening section 121 configured to accommodate the tilted surface section 162 is provided in the ball holder 120.

Figure 13:
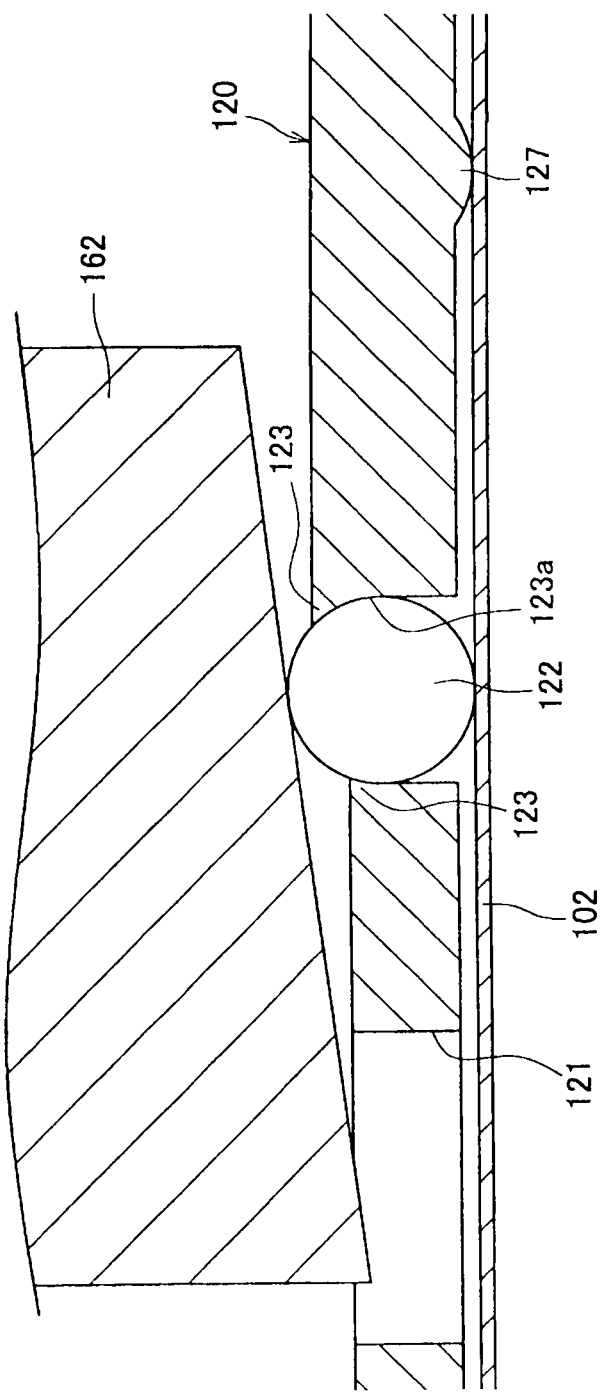
FIG. 13 is a partially enlarged sectional view illustrating the CMOS adaptor 160 and the ball holder 120 of the image pickup device 100 according to the same embodiment.

The ball holder 120 in which three balls 122 are disposed at approximately equal intervals on the same circumference rotates around the optical axis of the lens using the drive section 130 as a power source. Because the balls 122 move along the tilted surface section 162 of the CMOS adaptor 160, it is possible to move the CMOS adaptor 160 in which the CMOS image sensor 104 is disposed in the optical axis direction. As illustrated in FIG. 13, the hall 122 is accommodated in the opening section 123a and pressed by the ball pressing section 123 so that the ball does not move toward an upper side. Thereby, the ball 122 does not deviate even in a state in which the tilted surface section 162 of the CMOS adaptor 160 is not on the upper side of the ball 122. In addition, the convex section 127 is provided on the side of the thin plate 102 of the ball holder 120 and the ball holder 120 can easily slide on the thin plate 104.

[Ball 122]

An example of the ball 122 is a steel ball. The steel ball with high accuracy (an error of about 1 μm according to a class) is easily available at a low price because ready-made products of Japanese Industrial Standards (JIS) can be adopted. In this embodiment, the three balls 122 are held in the ball holder 120. The three balls 122 are disposed within the same surface perpendicular to the optical axis direction. The ball 122 is pressed to the thin plate 102 by the compression coil spring 184. The ball 122 is an example of a rotating member. The ball 122 is disposed between the tilted surface section 162 and the front panel 110. The ball 122 is in contact with the tilted surface section 162 and rotates and moves along a tilt direction of the tilted surface section 162. The ball 122 rotates along the circumference centered on the optical axis.

[Drive Section 130]

The drive section 130 is a gear box, and includes, for example, a drive motor 132 and a gear section 134 having a plurality of spur gears. A very high speed reduction ratio is necessary for the gear section of the drive section 130 so as to move the CMOS adaptor 160 in the optical axis direction with high accuracy. In order to implement, for example, 500:1, in compliance with the gear section 124 of the ball holder 120, the drive section 130 has, for example, a 5-stage reduction gear section 134.

[IR Cut Unit 140 and Others]

In the IR cut unit 140, an IR cut filter is provided. The IR cut filter is disposed on the optical axis or outside the optical axis in correspondence with a level of luminance of an object. The IR cut unit 140 has a mechanism in which the arrangement of the IR cut filter is switchable, for example, by the motor 141.

The IR cut unit is usually disposed in the CMOS adaptor 160. On the other hand, the IR cut unit 140 of this embodiment is disconnected from the CMOS adaptor 160 or the CMOS image sensor 104, and is fixed to the front panel 110 via the IR cut unit pressing section 142. Thereby, it is possible to implement weight reduction or simplification (for example, weight balance improvement) of the movable CMOS adaptor 160 and move the stable CMOS image sensor 104. In addition, screw fastening (usually tapping) is unnecessary when the IR cut unit is disposed in the CMOS adaptor, and a factor by which the CMOS adaptor 160 is deformed can be reduced.

The IR cut unit pressing section 142 has the convex section 143 provided at the tip of the projection section 144. The convex section 143 regulates the ball holder 120 not to move in the optical axis direction. The IR cut unit pressing section 142 is fixed to the front panel 110 via the screw hole 145. In addition, the opening section 147 is provided in a plate section 146 of the IR cut unit pressing section 142 so that light from the object passes through.

[Optical Low-Pass Filter 154 and Others]

The optical low-pass filter pressing section 152 is fixed to the lens side of the CMOS adaptor 160, for example, by a tapping screw. The optical low-pass filter 154 and the seal member 156 are disposed between the optical low-pass filter pressing section 152 and the CMOS adaptor 160. The optical low-pass filter removes an unnecessary optical component to capture an image of the object. The seal member 156 has a shape surrounding the CMOS image sensor 104, and prevents the intrusion of dust, light, or the like by sealing the CMOS image sensor 104. The seal member 156 is made of, for example, rubber.

[CMOS Adaptor 160]

The CMOS adaptor 160 includes a CMOS placing section 161, tilted surface sections 162, projection sections 164, through-holes 164a, and the like.

The CMOS image sensor 104, which receives light from the object, is placed in the CMOS placing section 161. The CMOS placing section 161 has a surface perpendicular to the optical axis.

The tilted surface section 162 is provided in the CMOS placing section 161, and is formed to be tilted with respect to the axis of light that enters the CMOS image sensor 104. A tilt direction of the tilted surface section 162 is a direction along the circumference centered on the optical axis. The three tilted surface sections 162 are provided on the circumference centered on the optical axis, and the balls 122 are provided on the tilted surface section 162 one by one. The tilted surface sections 162 may be disposed at intervals that are not equal to each other. Thereby, it is possible to adjust the arrangement of various members other than the CMOS adaptor 160.

In the CMOS adaptor 160, the CMOS image sensor 104 mounted on the hoard 106 is fixedly adhered by an aligning mechanism in a state in which the CMOS image sensor 104 is accurately positioned with respect to a reference surface of the CMOS adaptor 160.

The projection sections 164 are on the outer periphery of the CMOS adaptor 160, and are provided at approximately equal intervals on the same circumference in the vicinity of the tilted surface sections 162. The through holes 164a are formed in the three projection sections 164 of the CMOS adaptor 160. The shaft members 115 pass through the through holes 164a. Thereby, the CMOS adaptor 160 is assembled in the front panel 110. After the assembly, the compression coil springs 184 pass through the shaft members 115 and the springs 184 are compressed by the spring pressing sections 182. As a result, the springs 184 constantly press the CMOS adaptor 160 even when the CMOS adaptor 160 is positioned in a movable range of the optical axis direction.

The CMOS image sensor 104 is an example of an image pickup element, and converts optical information of light reception into an electrical signal. A charge coupled device (CCD) image sensor or the like may be used as the image pickup element. The board 106 has a circuit connected to the CMOS image sensor 104, or the like.

[Others]

The end point sensor 170 is, for example, a photo coupler, and detects a rotation position of the ball holder 120.

The spring pressing section 182 prevents the movement of the spring 184 so that the compression spring 184 can press the CMOS adaptor 160 to the lens side.

The spring 184 is an example of a pressing member, and presses the CMOS adaptor 160 in a direction of the ball 122 so that the tilted surface section 164 formed in the CMOS adaptor 160 is constantly in contact with the ball 122.

[Tilt of CMOS Image Sensor 104]

In the mechanism according to this embodiment, the CMOS adaptor 160 becomes a main factor of the tilt of the CMOS image sensor 104 with respect to the optical axis. Other components capable of affecting the tilt are adhered by aligning the front panel 110, the thin plate 102, the balls 122, and the CMOS image sensor 104.

The front panel 110 is affected by the squareness of the C mount section (lens mounting section 112) and the back surface 111 on which the thin plate 102 is placed, but this can be implemented with high accuracy by screw processing of the lens mounting section 112 on a back surface reference. The other components can be implemented with high accuracy at a low price as described above.

In the CMOS adaptor 160, the variation (mismatch/non-uniformity) of three tilted surfaces toward a reference surface becomes the tilt of the CMOS image sensor 104. However, because other elements can be implemented with high accuracy according to this mechanism, necessary performance can be implemented as a whole if the CMOS adaptor 160 is manufactured with accuracy that can be implemented in usual resin molding for the above-described dimension accuracy.

<2. Operation of Image Pickup Device 100>

[Rotation of Ball Holder 120]

When a speed reduction ratio is increased, there is a merit in that a drive torque can be increased. As a result, a size of the drive motor 132 of the drive section 130 can be reduced. Although the hall holder 120 can be manually rotated, it is necessary to stably rotate and control the ball holder 120 at a very small angle so as to adjust a flange focal length with high accuracy. In the manual case, this is difficult. On the other hand, in this mechanism, a final movement amount of the CMOS image sensor 104 is controlled by a rotation angle of the ball holder 120. Thus, the end point sensor 170 specifies a reference position of the ball holder 120 as the origin, and a position (=angle) from the origin is controlled by the number of rotations (rotation angle) of the motor 132.

[Operation of Image Pickup Device 100]

The operation of the image pickup device 100 of this embodiment will be described. In summary, when the motor 132 rotates, the speed is reduced by the gear sections 134 and 124 and the gear sections 134 and 124 rotate the ball holder 120. As a result, the three balls 122 each press the three tilted surface sections 162 of the CMOS adaptor 160.

The CMOS adaptor 160 is pushed up by the ball 122 pressing the tilted surface section 162 using the shaft member 115 as a moving direction specifying member. In the CMOS adaptor 160, the springs 184 constantly press the balls 122 in three positions in the vicinity of the balls 122. Accordingly, the CMOS adaptor 160 is pushed up when the ball 122 is pressed while maintaining a posture (tilt).

According to this embodiment described above, a mechanism in which alignment can be implemented with high accuracy can be implemented in a small size at a low price in a mechanism that adjusts the CMOS image sensor 104 (image pickup element) to a position of the flange focal length of the image pickup device 100 (camera).

The preferred embodiments of the present invention have been described above with reference to the accompanying drawings, whilst the present invention is not limited to the above examples, of course. A person skilled in the art may find various alternations and modifications within the scope of the appended claims, and it should be understood that they will naturally come under the technical scope of the present invention.

REFERENCE SIGNS LIST

100 Image pickup device
102 Thin plate
104 CMOS image sensor
106 Board
110 Front panel
120 Ball holder
122 Ball
130 Drive section
140 IR cut unit
142 IR cut unit pressing section
152 Optical low-pass filter pressing section
156 Seal member
160 CMOS adaptor
170 End point sensor
182 Spring pressing section
184 Spring
111 Back surface
112 Lens mounting section
113 Opening section
114 Annular projection section
115 Shall member
116 Stopper
117, 118, 119 Fixing section
117a, 118a, 119a Screw hole
121 Opening section
123 Ball pressing section
124 Gear section
125 First projection section
126 Second projection section
127 Convex section
132 Motor
134 Gear section
131 Screw
140 IR cut unit
141 Motor
142 IR cut unit pressing section
143 Convex section
144 Projection section
145 Screw hole
146 Plate section
147 Opening section
160 CMOS adaptor
161 CMOS placing section
162 Tilted surface section
164 Projection section
164a Through-hole
170 End point sensor
171 Screw
182 Spring pressing section
183 Screw

The invention claimed is:

1. An image pickup device comprising:
   a placing section on which an image pickup element that receives light from an object is placed;
   a tilted surface section provided on the placing section and tilted with respect to the axis of light that enters the image pickup element;
   a direction specifying section, which specifies a moving direction so that the placing section moves in parallel to an optical axis direction;
   a panel section having a surface perpendicular to the optical axis direction;
   a rotating member, which is disposed between the tilted surface section and the panel section and rotates and moves along a tilt direction of the tilted surface section by being in contact with the tilted surface section;
   an annular holding member, which rotates around the optical axis and rotatably holds the rotating member;
   a drive section, which causes the holding member to rotate; and
   a friction reduction member, which is disposed between the rotating member and the panel section and reduces friction with the rotating member compared to friction between the panel section and the rotating member,
   wherein the annular holding member has a convex section at a side of the friction reduction member and abuts the friction reduction member via a convex section.

2. The image pickup device according to claim 1, wherein:
   the tilt direction of the tilted surface section is a direction along a circumference centered on the optical axis, and
   the rotating member rotates on the circumference centered on the optical axis.

3. The image pickup device according to claim 1, wherein:
   the placing section has a surface perpendicular to the optical axis, and
   the direction specifying section is fixed to the panel section.

4. The image pickup device according to claim 1, wherein:
   the direction specifying section is three rod members parallel to the optical axis, and
   a through-hole through which the direction specifying section passes in parallel to the optical axis is provided in the placing section.

5. The image pickup device according to claim 1, comprising:
   a pressing member, which presses the placing section to a panel side.

6. The image pickup device according to claim 1, wherein:
   three tilted surface sections are provided on a circumference centered on the optical axis, and
   the rotating member is provided on each of the tilted surface sections.

7. The image pickup device according to claim 6, wherein:
   the tilted surface sections are disposed at intervals that are not equal to each other.

8. The image pickup device according to claim 1, comprising:
   an infrared cut filter, which is provided on the optical axis from the image pickup element to the object and fixed to the panel.

* * * * *